(12) United States Patent
Alkov et al.

(10) Patent No.: US 9,589,047 B2
(45) Date of Patent: *Mar. 7, 2017

(54) CATEGORIZING USERS BASED ON SIMILARITY OF POSED QUESTIONS, ANSWERS AND SUPPORTING EVIDENCE

(71) Applicant: International Business Machines Corporation, Armonk, NY (US)

(72) Inventors: Christopher S. Alkov, Austin, TX (US); Suzanne L. Estrada, Boca Raton, FL (US); Peter F. Haggar, Raleigh, NC (US); Kevin B. Haverlock, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,221

(22) Filed: Mar. 1, 2016

(65) Prior Publication Data

US 2016/0179928 A1 Jun. 23, 2016

Related U.S. Application Data

(63) Continuation of application No. 14/267,184, filed on May 1, 2014.

(51) Int. Cl.
*G06F 7/00* (2006.01)
*G06F 17/30* (2006.01)
(Continued)

(52) U.S. Cl.
CPC .. *G06F 17/30598* (2013.01); *G06F 17/30401* (2013.01); *G06F 17/30601* (2013.01); *G06N 99/005* (2013.01); *G06Q 50/00* (2013.01); *H04L 12/58* (2013.01); *H04L 51/04* (2013.01); *H04L 51/046* (2013.01); *H04L 51/32* (2013.01)

(58) Field of Classification Search
None
See application file for complete search history.

(56) References Cited

U.S. PATENT DOCUMENTS 6,424,971 B1 7/2002 Kreulen et al.
6,804,670 B2 10/2004 Kreulen et al.
(Continued)

OTHER PUBLICATIONS

List of IBM Patents or Patent Applications Treated as Related (Appendix P), 2 pages.

(Continued)

*Primary Examiner* — Tuan A Pham
(74) *Attorney, Agent, or Firm* — Stephen J. Walder, Jr.; William J. Stock (57) ABSTRACT

Mechanisms are provided for performing an operation based on an identification of similar lines of questioning by input question sources. Question information identifying extracted features of an input question and a first source of the input question is obtained. A clustering operation is performed to cluster the input question with one or more other questions of a cluster based on a similarity of the extracted features of the input question to features of the one or more other questions. An operation is performed based on results of the clustering of the input question with the one or more other questions.

8 Claims, 5 Drawing Sheets

(51) Int. Cl.
*H04L 12/58* (2006.01)
*G06Q 50/00* (2012.01)
*G06N 99/00* (2010.01)

(56) References Cited

U.S. PATENT DOCUMENTS

| | | | |
|---|---|---|---|
| 7,636,730 | B2 | 12/2009 | Sanfilippo et al. |
| 7,720,870 | B2 | 5/2010 | Barbosa et al. |
| 8,108,392 | B2 | 1/2012 | Marvit et al. |
| 8,484,181 | B2 | 7/2013 | Levin et al. |
| 8,832,584 | B1* | 9/2014 | Agarwal ............... G06F 3/0483 715/776 |
| 2008/0195378 | A1* | 8/2008 | Nakazawa ........ G06F 17/30654 704/9 |
| 2009/0271417 | A1 | 10/2009 | Toebes et al. |
| 2009/0287678 | A1* | 11/2009 | Brown ............. G06F 17/30654 |
| 2009/0327279 | A1 | 12/2009 | Adachi et al. |
| 2010/0030769 | A1* | 2/2010 | Cao .................. G06F 17/30696 707/738 |
| 2011/0066587 | A1 | 3/2011 | Ferrucci et al. |
| 2011/0125734 | A1* | 5/2011 | Duboue .................. G09B 7/00 707/723 |
| 2012/0078888 | A1* | 3/2012 | Brown ............. G06F 17/30654 707/723 |
| 2012/0089605 | A1 | 4/2012 | Bangalore et al. |
| 2012/0215773 | A1 | 8/2012 | Si et al. |
| 2013/0007055 | A1 | 1/2013 | Brown et al. |
| 2013/0018652 | A1 | 1/2013 | Ferrucci et al. |
| 2013/0066886 | A1 | 3/2013 | Bagchi et al. |

OTHER PUBLICATIONS

"Word Clustering", http://www.ilc.cnr.it/EAGLES96/rep2/node37.html, 5 pages, accessed on Apr. 4, 2013.

Chen, Ting-Li et al., "A New Clustering Algorithm Based on Self-Updating Process", In JSM Proceedings, Statistical Computing Section, Salt Lake City, Utah; American Statistical Association, pp. 2034-2038, http://www.stat.sinica.edu.tw/tlchen/mypaper/2007jsm.pdf, 2007, 5 pages.

Dhillon, Inderjit S., "Co-clustering documents and words using Bipartite Spectral Graph Partitioning", Proceedings of the Seventh ACM SIGKDD International Conference on Knowledge Discovery and Data Mining (KDD '01), www.cs.utexas.edu/~inderjit/public_papers/kdd_bipartite.pdf, 2001, 6 pages.

High, Rob, "The Era of Cognitive Systems: An Inside Look at IBM Watson and How it Works", IBM Corporation, Redbooks, Dec. 12, 2012, 16 pages.

IBM, "An information theoretic approach for customer modeling", IP.com, IPCOM000015832D, Jun. 21, 2003, 14 pages.

McCord, M.C. et al., "Deep parsing in Watson", IBM J. Res. & Dev. vol. 56 No. 3/4 Paper 3, May/Jul. 2012, pp. 3:1-3:15.

Yuan, Michael J., "Watson and healthcare, How natural language processing and semantic search could revolutionize clinical decision support", IBM developerWorks, IBM Corporation, Apr. 12, 2011, 14 pages.

* cited by examiner

CATEGORIZING USERS BASED ON SIMILARITY OF POSED QUESTIONS, ANSWERS AND SUPPORTING EVIDENCE

This application is a continuation of application Ser. No. 14/267,184, filed May 1, 2014, status pending.

BACKGROUND

The present application relates generally to an improved data processing apparatus and method and more specifically to mechanisms for identifying and categorizing users based on similarity of posed questions, returned answers, and supporting evidence.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States patent application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system comprising a processor and a memory, for performing an operation based on an identification of similar lines of questioning by input question sources is provided. The method comprises obtaining, by the data processing system, question information identifying extracted features of an input question and a first source of the input question. The method further comprises performing, by the data processing system, a clustering operation to cluster the input question with one or more other questions of a cluster based on a similarity of the extracted features of the input question to features of the one or more other questions. In addition, the method comprises performing, by the data processing system, an operation based on results of the clustering of the input question with the one or more other questions. The operation facilitates at least one of a collaboration between the first source of the input question and a second source of another question in the cluster, a communication between the first source of the input question and the second source of the other question in the cluster, or a reporting of the results of the clustering operation to either the first source of the input question, the second source of the other question in the cluster, or a third party.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

While question and answer (QA) systems provide tools for providing answers to input questions using natural language processing of textual sources, such as a corpus of electronic documents, websites, portions of text, and the like, there are other sources of information that may be obtained from such QA systems that are not directly related to the generation of an answer for a particular input question. For example, in certain implementations of a QA system, such as the IBM Watson™ QA system, there are advantages to identifying similarities between user questions submitted by the same or different users, the answers generated for these questions, and evidence passage responses that are the textual sources, from the corpus, of the answers to the questions. Taken together, these three elements, i.e. a Question (Q)-Answer (A)-Evidence Passage (P) triplet, represents a line of questioning. In various environments it is beneficial to obtain information about similar lines of questioning being input by the same or different users.

For example, in a secure computing environment, where knowledge is on a need-to-know basis, it may occur that two individuals are exploring a same topic without the knowledge of each other. In such a case, it may be advantageous for a third person, e.g., a system administrator, or the like, to identify the two individuals who are looking at the same topic and introduce the two individuals for collaboration purposes. In other environments, it may be beneficial to identify a single user as presenting the same or different lines of questioning about a particular topic, e.g., an individual using different question formulations in an attempt to access confidential or secure information. In still another environment, providers of products, services, informational websites, social networking websites, and the like, may make use of information regarding similar lines of questioning from the same or different customers/users in order to target advertising, the provision of products and/or services, and the like. The uses for identifying similar lines of questions are many and not all can be set forth herein, but are intended to be within the spirit and scope of the illustrative embodiments as will be readily apparent to those of ordinary skill in the art in view of the present description.

The illustrative embodiments provide mechanisms for autonomously identifying similar lines of questioning and autonomously categorizing lines of questioning. In particular, in response to a user submitting an input question to a QA system, the input question text (Q), the final answer (A) generated for the input question, and the evidence passage(s) (P) providing the source of the final answer are stored in association with each other, i.e. a Q-A-P triplet is stored. In some illustrative embodiments, rather than storing only the final answer, each of a plurality of candidate answers above a predetermined confidence score may be stored in association with the question text and/or each of a plurality of evidence passage(s) for each of the answers may be stored. As a result, multiple Q-A-P triplets may be stored for each input question. Moreover, information identifying the user that submitted the question giving rise to the Q-A-P triplet may be stored and maintained for further processing in order to identify users submitting similar lines of questioning.

The mechanisms of the illustrative embodiments perform clustering on the features/attributes (or "characteristics") of the question (Q), the answer (A), and the evidence passages (P) to thereby generate clusters of Q-A-P elements, where each Q-A-P element has associated user information identifying the user submitting the question of the Q-A-P element. Thus, each Q-A-P element represents the feature attributes of the question, the answer, and the evidence passage(s), e.g., keywords, terms, phrases, lexical/semantic features, metadata features, etc., as well as the user information. Additional weighting values may be applied to take into account the confidence values that were calculated for the various aspects of the answer in the Q-A-P element. Over time, as more Q-A-P elements are added to the system, i.e. stored and maintained, the clustering of the Q-A-P elements begins to organize and cluster together such that related lines of questioning and users associated with related lines of questioning are able to be identified.

The centers of the various clusters that are generated through this clustering methodology are identified using an algorithm, such as the Euclidean distance from one Q-A-P element to another. Elements within a predetermined distance of each other in a cluster are identified and the corresponding users that submitted the questions of the Q-A-P elements so identified are considered to have asked similar questions. As a result, a set of users that have expressed an interested in similar subject matter by submitting similar lines of question are identified.

Having identified a set of users submitting similar lines of questions, various subsequent operations may be performed based on the identification. In one illustrative embodiment, users that are determined to have submitted similar lines of questioning may be sent requests as to whether they wish to join in a collaborative communication with each other. For example, this may be a request for the user to join a chat group directed to the same line of questioning or a topic associated with the line of questioning, initiating an instant messaging session with the other users submitting similar lines of questioning, exchanging emails and/or addresses with other users submitting similar lines of questioning, initiating a conference telephone call with the users submitting similar lines of questioning, or the like. In other illustrative embodiments, the identification of users submitting similar lines of questioning may be used as a basis for sending targeted advertising to those users or providing the information about the users to an advertiser. In still other illustrative embodiments, various business and governmental organizations may utilize the identification of users submitting similar lines of questioning to identify groups of users whose information may be further mined for extraction of useful information including demographic information, or for initiating further targeted processing of user information, e.g., analyzing other activities by the identified users on other websites, other communication systems, or the like.

In one illustrative embodiment, the identification of users submitting similar lines of questioning may be used to identify potential organized illegal activities, such as organized crime, terrorist activity, or the like. For example, users submitting questions clustered together and directed to the area of bomb making may be used to identify these individuals for further scrutiny and evaluation of other commonalities or similar activities indicative of an organized attempt to perform an act of terrorism.

Thus, with the mechanisms of the illustrative embodiments, when a new question is received, it is processed by a QA system pipeline to generate a final answer to the input question along with an evidence passage that is the source of the final answer and supports the final answer as being the correct answer for the input question. This results in a Q-A-P triplet which is then clustered according to the similarly of extracted features/attributes of the new question with the features/attributes of other Q-A-P triplets generated for other input questions by the same or different users to thereby generate various clusters or update and add to existing clusters. Through this clustering, one can determine the closest cluster for the new question and the group of users submitting similar questions. Based on this identification of users submitting similar questions, i.e. users submitting similar lines of questioning, or a single user submitting multiple questions of a similar type, additional processing may be performed based on the desired implementation, e.g., inviting the users to collaborate, initiating communication links between the users, generating reports identifying users submitting similar lines of questioning, and the like.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
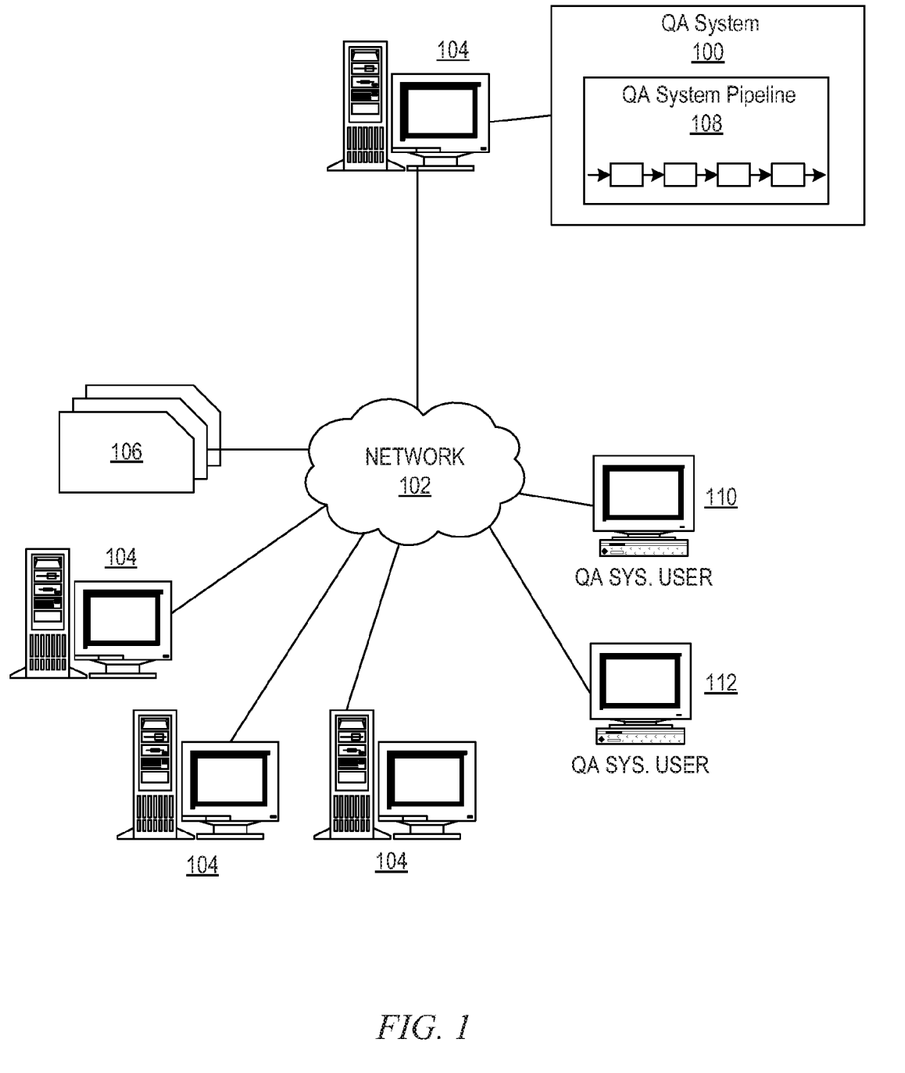
FIG. 1 depicts a schematic diagram of one illustrative embodiment of a question/answer creation (QA) system in a computer network.
Figure 2:
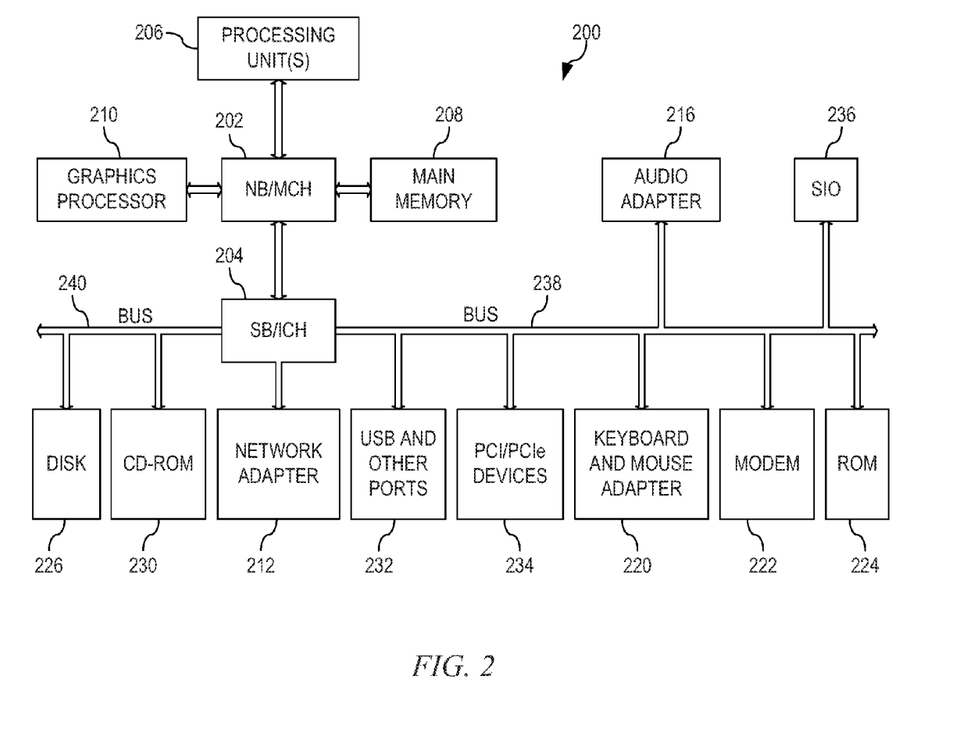
FIG. 2 is a block diagram of an example data processing system in which aspects of the illustrative embodiments may be implemented.
Figure 3:
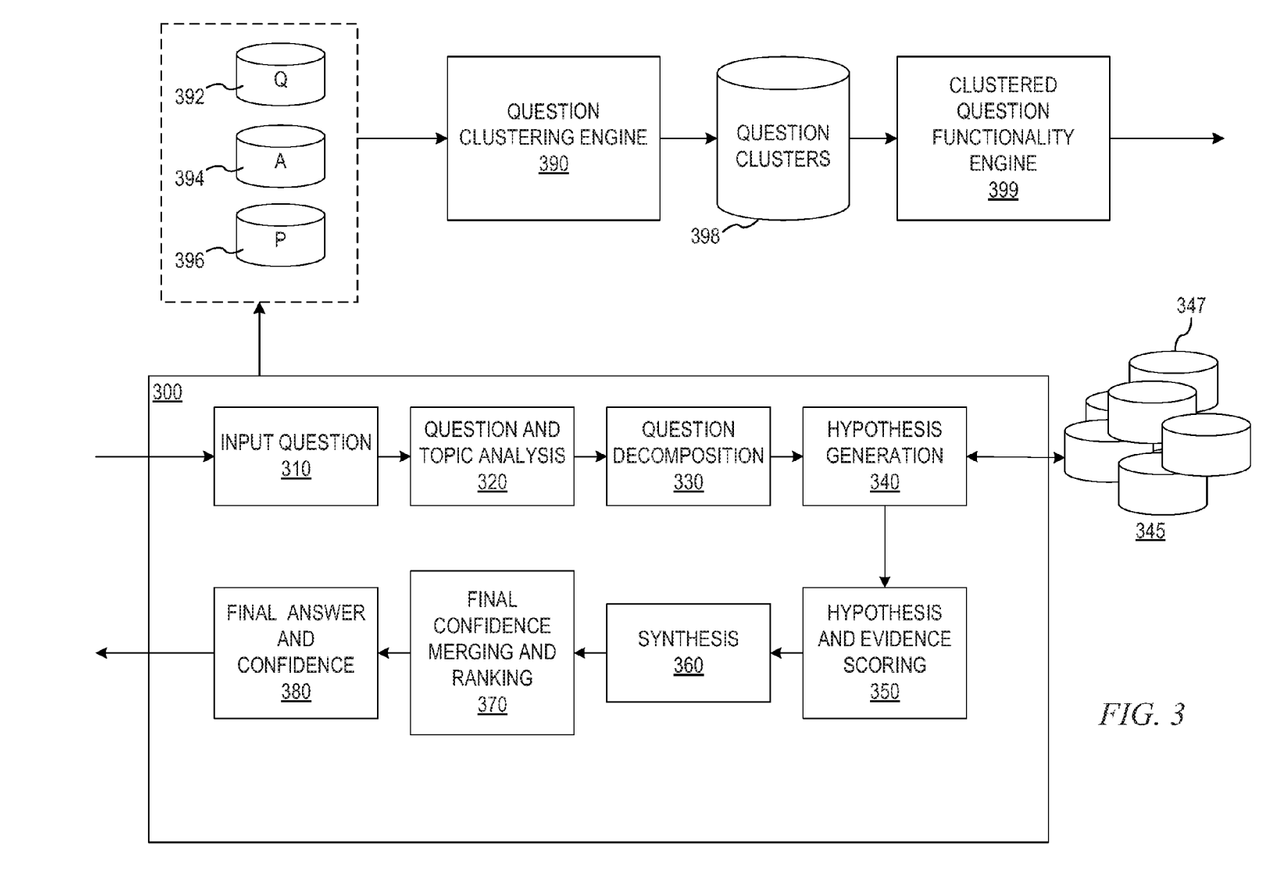
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to identifying similar lines of questioning through clustering of questions, related answers, and related evidence passages, as well as identifying individual users submitting similar lines of questioning for purposes of further processing and functionality.

Since the mechanisms of the illustrative embodiments work in conjunction with a QA system, it is important to first have an understanding of how question and answer creation and processing in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. The IBM Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 500, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpora of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 345. That is, these various sources themselves, different collections of sources, and the like, may represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question.

As mentioned above, the mechanisms of the illustrative embodiments extend and augment the functionality of the QA system by providing mechanisms for identifying similar lines of questioning, potentially from different users or sources. For example, the identification of similar lines of questioning may be performed using a clustering methodology for clustering the questions, their answers, and the evidence passages to identify similar questions being submitted to the QA system. Information about the source of the questions may be maintained and used to identify a single source submitting multiple lines of questioning that are similar to one another, or to identify different sources submitting lines of questioning that are similar to one another. The sources themselves may be users, computing devices, organizations, governmental entities, or any other entity or source of input questions submitted to the QA system. Once identified, additional operations may be performed with regard to the sources of the similar lines of questioning to achieve greater functionality including, but not limited to, initiating communication links between the sources, sending invitations to the sources to join digital communities, generating reports identifying the similar lines of questioning and the sources of the similar lines of questioning, initiating communication with a third party to inform the third party of the similar lines of questioning and the sources of the similar lines of questioning, and the like.

The operations of the illustrative embodiments may be performed as a post-processing type of operation or in a parallel manner with the other operations of the QA system pipeline 300 using results generated by the QA system pipeline 300 to perform these operations. For example, results of question analysis performed in phase 320, evidence gathering in phases 340-350, and final answer analysis in phase 370-380 may be used to extract features of the question, the answer, and one or more evidence passages supporting the answer, to perform clustering based on these features and identify similar questions being submitted by the same or different sources. Based on the clustering, additional functions are performed to facilitate interaction of the sources of the similar questions and/or report the similarities of the questions and their sources for further consideration by third parties.

Thus, with reference again to FIG. 3, the input question 310 is analyzed in accordance with phase 320 of the pipeline 300 described above to extract features/attributes of the input question 310. For example, through the analysis performed in phase 320, various features including the focus, lexical answer type (LAT), the question classification (QClass), and question sections (QSection) features may be extracted and analyzed. The focus of a question is the portion of the question that references the answer, e.g., the word "he" in the question "was he the greatest football player?" is the focus of the question indicating that a male person is the focus of the question. The LAT refers to the terms in the question that indicates what type of entity is being asked for, e.g., in the statement "he liked to write poems" the LAT is "poets". The QClass is the type the question belongs to, e.g., name, definition, category, abbreviation, number, date, etc., e.g., if the question is "who was the first President of the United States?," the QClass is a name since the question is looking for a name as the answer. The QSection refers to question fragments that require special processing and inform lexical restraints on the answer, e.g., "this 7 letter word . . . " provides a lexical restraint on the answer being a 7 letter word.

Similarly, the feature/attribute extraction may be performed on the final answer generated for the input question 310 and the corresponding evidence passages used to support the identification of the final answer to thereby provide additional information for identifying similar questions. That is, by considering the extracted features/attributes of the final answers and supporting evidence passages, questions that may be differently formed or formulated but directed to similar subject matter and looking for similar answers may be identified. Thus, the identification of similar questions is not limited to similarity of features of the input questions themselves, but the results generated for the input question by the QA system.

The extracted features/attributes of the question, answer, and evidence passages may be used as input to a clustering algorithm that associates the input question 310 with a particular cluster within a plurality of clusters, where each cluster represents a grouping of questions having similar features/attributes in the input question themselves, the final answers returned for the input questions, and the evidence passages for the final answers. Various clustering algorithms may be employed to perform the clustering of the questions based on the extracted features/attributes. Examples of clustering algorithms that may be employed for this purpose include the clustering algorithms described in Dhillon, "Co-Clustering Documents and Words Using Bipartite Spectral Graph Partitioning," University of Texas, Austin, KDD 2001 San Francisco, Calif., 2001 and "Word Clustering," EAGLES Preliminary Recommendations on Semantic Encoding Interim Report, May 1998. Moreover, a number of U.S. patents and patent application Publications describe lexical clustering mechanisms that may be employed to perform clustering of the questions of the illustrative embodiments including:

U.S. Pat. No. 6,804,670 entitled "Method for Automatically Finding Frequently Asked Questions in a Helpdesk Data Set";

U.S. Pat. No. 6,424,971 entitled "System and Method for Interactive Classification and Analysis of Data";

U.S. Pat. No. 8,108,392 entitled "Identifying Clusters of Words According to Word Affinities";

U.S. Pat. No. 7,720,870 entitled "Method and System for Quantifying the Quality of Search Results Based on Cohesion"

U.S. Pat. No. 7,636,730 entitled "Document Clustering Methods, Document Cluster Label Disambiguation Methods, Document Clustering Apparatus, and Articles of Manufacture"; and U.S. Patent Application Publication No. 2009/0327279 entitled "Apparatus and Method for Supporting Document Data Search." These are but examples of techniques used for clustering lexical content based on features/attributes of the lexical content. Other techniques for clustering words, groups of words, or the like, may be applied to the questions and extracted features/attributes of the questions in the illustrative embodiments, without departing from the spirit and scope of the illustrative embodiments. For example, various techniques based on classifying the features/attributes, quantifying features/attributes, determining semantic similarities, and the like, may be used without departing from the spirit and scope of the illustrative embodiments.

Based on the clustering operation performed by the clustering algorithm, the input question 310 is associated with either an already established cluster, such as may have been generated as a result of training of the QA system to identify similar questions using a training set of input questions, or a new cluster is generated for the input question 310. The assignment of a question, and its associated extracted features/attributes from the question itself, the answer, and the evidence passages, i.e. the Q-A-P triplet, to a cluster may be performed with regard to a determined measure of closeness or similarity of the question, its associated features/attributes, etc., with questions and features/attributes of the other Q-A-P triplets already part of the established clusters. That is, if the Q-A-P's features/attributes are close enough to one or more clusters, the question and the corresponding Q-A-P triplet features/attributes are then associated with the one or more clusters. The determination of whether the Q-A-P triplet's features/attributes are "close enough" may be measured according to one or more thresholds defining what is "close enough." Thus, for example, if the determined distance between a measure of the question, as may be determined from measures associated with the Q-A-P's extracted features/attributes, and a center of a cluster is less than a predetermined threshold, then it may be determined that the question and the corresponding Q-A-P features/attributes should be associated with that cluster. A question and the corresponding Q-A-P features/attributes may be associated with more than one cluster if the question's Q-A-P features/attributes meet the threshold requirements for more than one cluster.

The above clustering may be performed by a question clustering engine 390 in response to input of extracted question features/attributes 392, corresponding answer features/attributes 394, and corresponding evidence passage features/attributes 396, which together define Q-A-P triplets for input questions. These extracted Q-A-P features 392-396 are input to the question clustering engine 390 which performs the clustering on the extracted features to associate the input question 310 with a cluster of questions. This operation may be performed with regard to a plurality of questions submitted by one or more sources, e.g., users, data processing or computing devices, organizations, or other source entities, such that a plurality of clusters may be generated with each cluster comprising one or more questions and their associated Q-A-P features/attributes. In addition, the question information, such as question extracted features/attributes 392, may comprise an identifier of the source of the question so that the sources of similar questions may be identified.

Thus, a set of clusters are generated and may be stored in the question clusters data structure 398. It should be appreciated that this question clusters data structure 398 may be initially populated with question clusters based on a training of the QA system pipeline 300 and the question clustering engine 390 using a training set of questions and/or corpus 345 to generate training clusters to which additional questions are clustered during runtime operation. The training clusters indicate the types of questions that the QA system has been trained to recognize and answer to a satisfactory degree. That is, these questions were used to train the QA system by adjusting its operation to provide satisfactory answering capability for these types of questions and thus, is likely to generate answers to similar questions during runtime with a high measure of confidence. The clusters are defined in accordance with common features/attributes for the various Q-A-P triplets associated with the cluster, e.g., common category, classification, lexical answer type, attribute scores, etc. The particular questions and their corresponding Q-A-P triplet features/attributes 392-396 may be stored in an cache (represented by the dashed line box in FIG. 3) with the question and corresponding Q-A-P triplet having an associated identifier or link to the cluster(s) in the question cluster data structure 398 with which the questions are associated.

During runtime operation, input questions 310 submitted to the QA system pipeline 300 are subjected to the analysis for extracting features/attributes of the input question, the final answer generated in phase 380, and the evidence passages supporting the final answer as determined from the hypothesis generation and scoring stages 340-350. This information is similarly stored in the cache as Q-A-P triplets using the extracted features/attributes 392-396 that are input to the question clustering engine 390 which performs clustering of the input question 310 based on these extracted features/attributes 392-396 of the Q-A-P triplet. Thus, based on the extracted features/attributes, the input question 310 may be plotted in relation to the already established question clusters and the distance between the plotted extracted features/attributes of the Q-A-P triplet and the cluster centers of the various established clusters may be identified.

For those distances that meet a predetermined criteria, e.g., the distance is equal to or less than a predefined threshold distance, the input question 310 may be associated with the corresponding existing question cluster. That is, the question clustering engine 390 determines that the input question is significantly similar to other questions associated with the established question clusters and would generally be added to those clusters. For example, if, through the feature/attribute extraction process it is determined that the input question's Q-A-P triplet indicates that the input question 310 is directed to a significantly same or similar domain, category of answer, or the like, as that of an existing question cluster, then the input question 310 may be associated with that particular existing question cluster in the question clusters data structure 398. In addition, the results of the clustering of the input question 310 with an existing cluster in the question clusters data structure 398 may be communicated to a clustered question functionality engine 399 for further functions and operations to be performed based on the clustering, as will be described in greater detail hereafter.

It should be appreciated that, through the clustering operations of the question clustering engine 390, the Q-A-P features/attributes may not be plotted in such a way as to be close enough to any existing question cluster, depending on the particular "close enough" threshold requirements, e.g., distance between the plotted Q-A-P features/attribute point and the center of existing question clusters. In such a case, a new question cluster may be generated. The new question cluster comprises questions whose Q-A-P features/attributes that are similar to one another as determined by a clustering criteria specifying a range of Q-A-P feature/attribute measures that are within a predetermined threshold value of one another. It should be appreciated that this new question cluster may include questions that are part of other question clusters in some instances such that a particular question may overlap or be included in multiple question clusters of the question cluster data structure 398.

As mentioned above, the results of the clustering performed on an input questions' extracted Q-A-P features/attributes 392-396 by the question clustering engine 390 may be input to a clustered question functionality engine 399 that performs an additional function/operation based on the results of the clustering. The particular function/operation that is performed may take many different forms based on the desired implementation. In some illustrative embodiments, the additional function/operation comprises sending a notification to the source of the input question 310 and/or sources of questions in the same question cluster with which the input question 310 is clustered, to inform the sources that the source of the input question 310 is submitting or is interested in the same subject matter as the sources of the other questions in the question cluster. The notification may comprise contact information for the other sources of questions in the question cluster.

In some illustrative embodiments, rather than, or in addition to, the sending of the notification, a communication connection or link between the source of the input question 310 and one or more other sources of questions in the question cluster with which the input question 310 is clustered may be automatically initiated. For example, an instant messaging session may be established between source A (a source of the input question 310) and source B (a source of another question in the question cluster with which the input question 310 is clustered). In some embodiments, the communication connection/link may be a telephone call, email correspondence, text message, or any other type of electronic or telephonic communication between sources.

In still further illustrative embodiments, the source may be informed of a group or organization associated with the subject matter to which the input question 310 is directed and with which one or more of the other sources of questions in the question cluster are associated. For example, through the clustering performed by the mechanisms of the illustrative embodiments, it may be determined that a common subject matter group of a social networking website exists between the sources of the questions in the question cluster. As a result, a notice may be sent to the source of the input question 310 informing the source of the group or organization and may provide a link or other type of invitation to join the group or organization.

In other illustrative embodiments, the additional function/operation performed by the clustered question functionality engine 399 may involve a reporting functionality/operation. The reporting functionality/operation may send a notice or report to a third party system, organization, person, or the like, to inform them of the results of the clustering. This reporting may serve many different purposes including, but not limited to, providing targeted advertising, identifying potential organization policy violations, identifying sources of potential illegal activity, identifying organized groups for further regulation or law enforcement, or the like. For example, advertisers may use clustering of similar questions to identify potential customers for services/products directed to a similar subject matter as the clustered questions, e.g., users' A and B are both asking questions about energy efficiency solutions for homes and thus, an energy efficient window manufacturing company may send targeted advertising to these users. Alternatively, a law enforcement agency may identify multiple users asking questions about explosive components and thus, may be users requiring additional surveillance. Any functionality/operation that may be implemented based on the clustering of questions and the identification of sources of similar questions may be implemented with the mechanisms of the illustrative embodiments without departing from the spirit and scope of the present invention.

It should be noted that while the mechanisms of the illustrative embodiments may be utilized to identify different sources of questions that are submitting similar questions to one another, the illustrative embodiments may further perform clustering of similar questions from the same source. This information is useful for identifying the areas of interest of a particular source. That is, if a source submits multiple questions directed to similar subject matter, it can be determined that the source is highly interested in the particular subject matter corresponding to that question. Hence, advertisers may send targeted advertising based on the identification of this subject matter through clustering, law enforcement can identify users that are potentially planning illegal activities based on the identification of questions directed to subject matter associated with such illegal activities, and the like.

Thus, with the mechanisms of the illustrative embodiments, clustering of questions may be used to identify sources of similar questions submitted to a QA system. Through this identification of clusters of similar questions, functionality/operations may be performed to initiate communication between sources, add sources to particular groups or organizations corresponding to the subject matter associated with the similar questions, send notifications of the similar questions to the sources and/or third parties, initiate further surveillance or monitoring of such sources, or the like.

Figure 4:
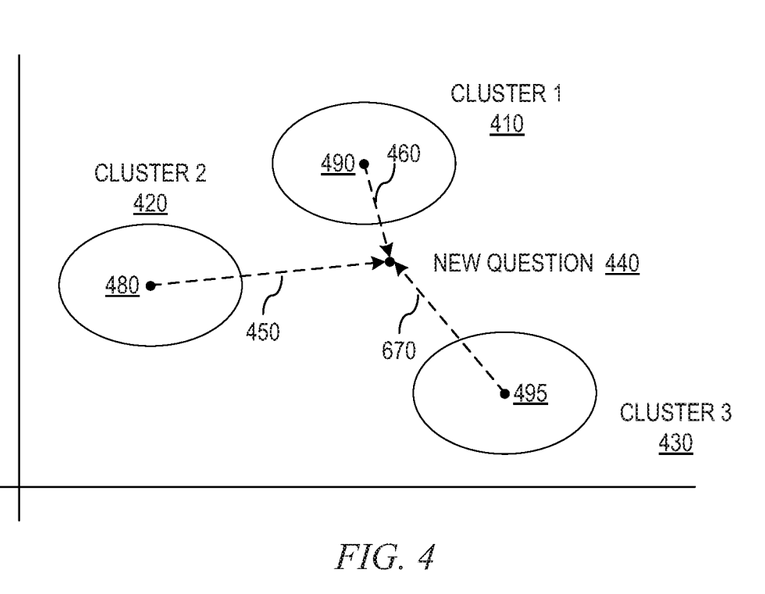
FIG. 4 illustrates an example of a plot of clusters and an input question in accordance with one illustrative embodiment.

The clustering of similar questions with each other based on extracted features/attributes of the Q-A-P triplets is further illustrated in FIG. 4 which shows a plot of clusters and an input question in accordance with one illustrative embodiment. The plot shown in FIG. 4 is with regard to an N-dimensional space along features/attributes of the input questions, their corresponding final answers, and the evidence passages in support of the final answers. For illustration purposes, a two-dimensional plot is depicted, however it should be appreciated that the plot may be along multiple dimensions in excess of 2.

As shown in FIG. 4, three established question clusters 410-430 have been defined through the clustering process based on the features/attributes of Q-A-P triplets already processed for other input questions and/or training questions. The question clusters 410-430 represent a grouping of questions having similar Q-A-P triplet features/attributes that all fall within X % of the cluster center 480-495 of the cluster 410-430.

A new inputs question 440 is then processed and plotted based on its extracted Q-A-P features/attributes. The Euclidean distances 450-470 from the plotted position of the new input question 440 to the cluster centers 480-495 for each of the clusters 410-430 is then determined and compared to one or more thresholds associated with the various clusters 410-430. If the distance meets the requirements of the one or more thresholds associated with the cluster 410-430, then the new input question 440 is determined to be similar to the questions associated with that cluster 410-430 and is also associated with that cluster 410-430. This may cause the definition of the cluster 410-430 to be expanded to include the additional new input question 440 and may thus, expand the borders of the cluster 410-430. In the depicted example, it is assumed that the new input question 440 meets the threshold requirements for cluster 410 only and thus, is associated with cluster 410.

Thus, the new input question 440 may be added to the cluster 410-430 with which it is determined to be associated based on similar Q-A-P features/attributes and corresponding information for the question, its corresponding Q-A-P features, and the source of the question 440, as well as its association with a cluster 410 may be stored in a cluster data structure 398. In this way, questions which may be from different sources that are not aware of one another, questions that have different formulations and may not be readily apparent as being related to one another, and the like, may be identified as corresponding to one another and directed to similar lines of questioning. This determination is not only based on features/attributes of the input question itself, but may also take into account the features/attributes of the final answer and evidence passages identified by the QA system when processing the input question. Clustering is used to identify these similar questions based on these extracted features/attributes of the Q-A-P triplets. Based on this identification of similar questions, additional functions to facilitate collaboration between sources, communication between sources, monitoring of sources, various other types of interactions between sources, and the like, may be performed.

Thus, the illustrative embodiments provide mechanisms for assisting in the identification of similar lines of questions and corresponding sources of such similar questions. Thresholds may be defined so as to identify questions that are similar, dissimilar, or within a range of similarity to other questions in one or more clusters. That is, for a cluster, a threshold distance between the center of the cluster and the plotted extracted features/attributes of the Q-A-P associated with a question may be specified and used to determine if a particular question is to be considered a part of the cluster or not. Different thresholds may be associated with different types of clusters, e.g., different subject matter based clusters may have different thresholds.

Moreover multiple thresholds may be associated with a cluster so as to define an upper and lower bound of distances or degrees of similarity between a question and other questions within the cluster. For example, if a question is within a first distance of a center of the cluster, the question may be determined to be highly similar to other questions of the cluster while if the question is between the first distance and a second farther distance, then the question may be considered of a medium similarity with the other questions of the cluster. Based on different levels of similarity of a question with the particular cluster, different types of subsequent functions/operations may be performed. For example, if a question is determined to be highly similar to the other questions in the cluster, an operation for initiating an instant messaging session with other sources may be automatically performed. If the question is determined to be of a medium similarity, then the source of the input question may be notified of the similarity and the identity of one or more other sources of questions in the cluster, but an instant messaging session may not be automatically initiated. May other types of combined, or similarity level based, functionality/operations may be used without departing from the spirit and scope of the illustrative embodiments.

It should be noted that the mechanism of the illustrative embodiments not only analyze and extract the features/attributes of the input question, but also the final answer and supporting evidence passages. In so doing, the confidence measure calculated by the QA system for the final answer may also be considered when performing the clustering operation. That is, features/attributes of final answers and their related evidence passages for final answers having relatively high confidence measures may be weighted heavier in a clustering calculation than features/attributes of final answers and evidence passages for final answers that have a relatively lower confidence measure. Thus, the extracted features/attributes may be weighted in accordance with the confidence measure of the final answer for the Q-A-P triplet.

To further illustrate the operation of the present invention, assume that the mechanisms of the illustrative embodiments are implemented with regard to a high security environment. In such an environment, user A from organization X may be asking questions about a particular terrorist group's activity in a foreign country. In addition user B from organization Y may be asking about terrorist activity in the same country and the answers may contain references to the terrorist group identified by user A's question.

In such a situation, the illustrative embodiments may identify the similarity of the lines of questioning of user A and user B due to the clustering of the input questions, the answers, and the supporting evidence passages generated by the QA system when processing user A and user B's input questions. As a result, a third party user or organization may be notified of the similar lines of questioning and may perform further operations or analysis to determine if user A and user B are collaborating and whether they should be collaborating. This further analysis and operations may involve performing further data collection and mining regarding user A and user B to determine if they are trusted users or not. For example, if user A and user B are both part of a law enforcement organization and are employed in a capacity where their access to information regarding terrorist groups and/or countries harboring terrorists is within their scope of employment, then user A and user B may be allowed to collaborate. In such a case, user A and user B may in fact be introduced through the mechanisms of the illustrative embodiments and/or communications may be automatically or semi-automatically initiated. However, if one or more of user A and user B have other information indicative of the user being affiliated with the terrorist organization, then collaboration should not be allowed. In such a case, appropriate law enforcement organizations may be informed of the potential threat.

Figure 5:
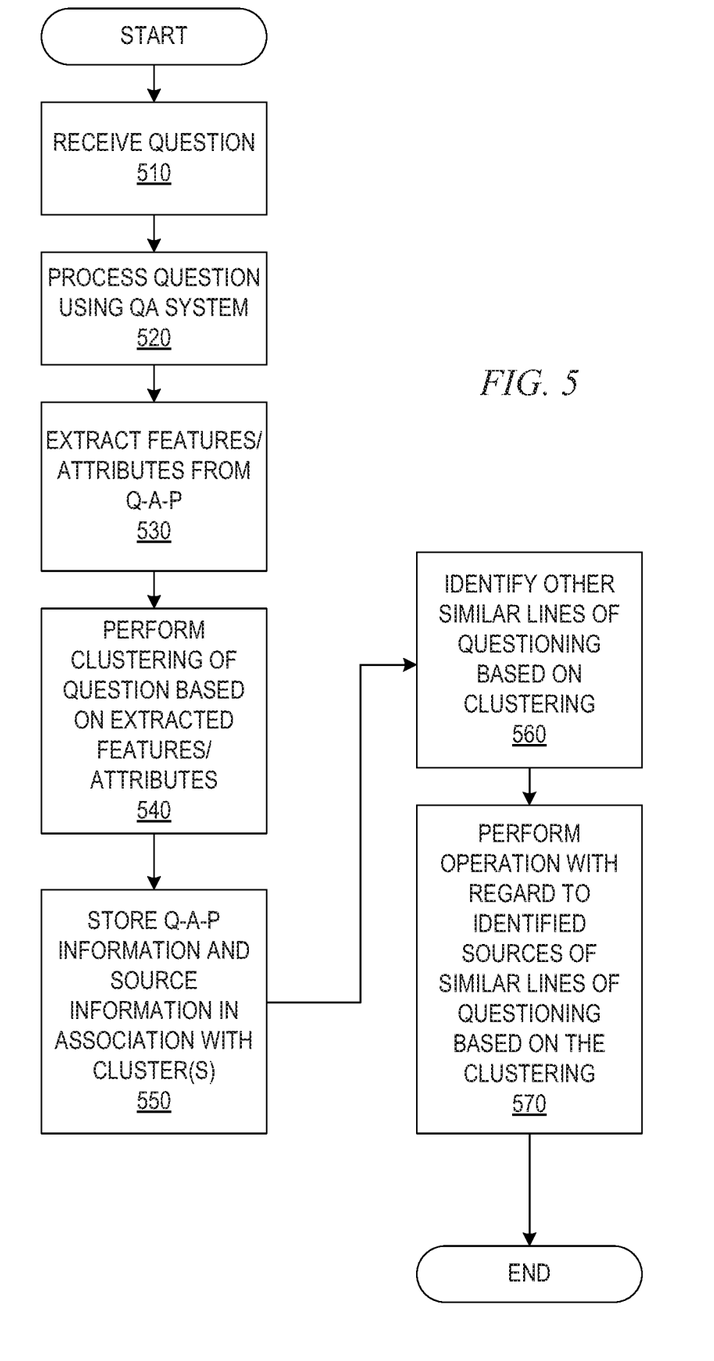
FIG. 5 is a flowchart outlining an example operation of a similar question clustering mechanism in accordance with one illustrative embodiment.

FIG. 5 is a flowchart outlining an example operation of a similar question clustering mechanism in accordance with one illustrative embodiment. As shown in FIG. 5, the operation starts by receiving an input question for processing by a QA system (step 510). The input question is processed by the QA system to generate a final answer to the input question and one or more evidence passages in support of the final answer being a correct answer for the input question (step 520). Features/attributes are extracted from the question, the final answer, and the evidence passages (step 530). The extracted features/attributes are used as a basis to perform a clustering of the input question with one or more clusters of other questions previously processed by the QA system (step 540). Source information identifying the source of the input question is stored in association with the extracted features/attributes and linked with the one or more clusters with which the question is clustered based on the extracted features/attributes (step 550).

The results of the clustering are used to identify other sources of questions submitting similar lines of questioning to the source of the input question (step 560). The identification of the source of the input question and the sources of the other questions in the clusters with which the input question is associated by the clustering operation is used to perform an operation with regard to the identified sources (step 570) and the operation terminates. This operation may take many different forms, but is generally related to facilitating at least one of a collaboration between the source of the input question and a source of another question in the cluster, a communication between the source of the input question and the source of the other question in the cluster, or a reporting of the results of the clustering operation to either the source of the input question, the source of the other question in the cluster, or a third party. Other operations may also be performed in replacement of, or in combination with, these types of operations. Thus, the mechanisms of the illustrative embodiments identify sources submitting similar lines of questioning and facilitates the performance of additional operations based on the identification of these sources as submitting similar lines of questioning.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for performing an operation based on an identification of similar lines of questioning by input question sources, the method comprising:
    obtaining, by the data processing system, question information identifying extracted features of an input question and a first source of the input question;
    performing, by the data processing system, a clustering operation to cluster the input question with one or more other questions of a cluster based on a similarity of the extracted features of the input question to features of the one or more other questions;
    performing, by the data processing system, an operation based on results of the clustering of the input question with the one or more other questions, wherein the operation comprises at least one of initiating a collaboration between the first source of the input question and a second source of another question in the cluster, initiating a communication between the first source and the second source, or a reporting of the results of the clustering operation to either the first source, the second source, or a third party, wherein:
        the input question is a question input to a Question and Answer (QA) system which processes the input question to generate an answer to the input question based on a corpus of information, and further generates one or more supporting evidence passages supporting the answer as being a correct answer for the input question, and
        performing the clustering operation to cluster the input question with the one or more other questions of a cluster comprises performing the clustering based on features of the input question, features of an answer, and features of the one or more supporting evidence passages; and
    for the input question, generating one or more question (Q)-Answer (A)-evidence Passage (P) triplets, and wherein performing the clustering operation comprises performing clustering on features of each of the Question (Q), Answer (A), and evidence Passage (P) of the one or more QAP triplets with features of QAP triplets associated with questions in a plurality of previously processed questions to thereby identify the one or more other questions of the cluster with which the input question is clustered.

2. The method of claim 1, wherein a plurality of different weighting factors are established for different features of at least one of the input question, the answer, or the one or more supporting evidence passages.

3. The method of claim 1, wherein:
the first source and second source are users,
the operation comprises sending a request to at least one of the first source or the second source requesting that the corresponding first source or second source join in a collaborative communication with the other source, and
the collaborative communication is at least one of a chat group, an instant messaging session, an electronic mail exchange, or a conference telephone call.

4. The method of claim 1, wherein the first source and second source are users, and wherein the operation comprises at least one of:
sending targeted advertising, by a third party source, to the first source and the second source,
providing information about the first source and the second source to the third party source,
initiating a targeted processing of user information of the first source or second source to analyze other activities by the first source or second source, or
identifying, by a government organization system, the first source and the second source as potentially engaged in illegal activity and targeting the first source and second source for further investigation of illegal activity.

5. The method of claim 1, wherein the operation comprises automatically establishing a communication connection between the first source and the second source.

6. The method of claim 1, wherein the extracted features and features of the one or more other questions comprise at least one of a focus, lexical answer type (LAT), question classification (QClass), or question sections (QSection).

7. The method of claim 1, wherein performing the clustering operation comprising clustering the input question based on a plot of the extracted features of the input question relative to a plot of features of the one or more other questions using at least one threshold value specifying a required distance from the plot of the extracted features of the input question to the plot of the features of the one or more other questions in order for the input question and the one or more other questions to be considered part of a same cluster.

8. An apparatus, comprising:
a processor; and
a memory coupled to the processor, wherein the memory comprises instructions which, when executed by the processor, cause the processor to:
obtain question information identifying extracted features of an input question and a first source of the input question;
perform a clustering operation to cluster the input question with one or more other questions of a cluster based on a similarity of the extracted features of the input question to features of the one or more other questions;
perform an operation based on results of the clustering of the input question with the one or more other questions, wherein the operation comprises at least one of initiating a collaboration between the first source of the input question and a second source of another question in the cluster at least by associating the first source and the second source with a same electronic communication group of an electronic communication system, or initiating a communication via a communication system, between the first source and the second source; and
for the input question, generate one or more question (Q)-Answer (A)-evidence Passage (P) triplets, and wherein performing the clustering operation comprises performing clustering on features of each of the Question (Q), Answer (A), and evidence Passage (P) of the one or more QAP triplets with features of QAP triplets associated with questions in a plurality of previously processed questions to thereby identify the one or more other questions of the cluster with which the input question is clustered.

* * * * *